Patented Nov. 17, 1942

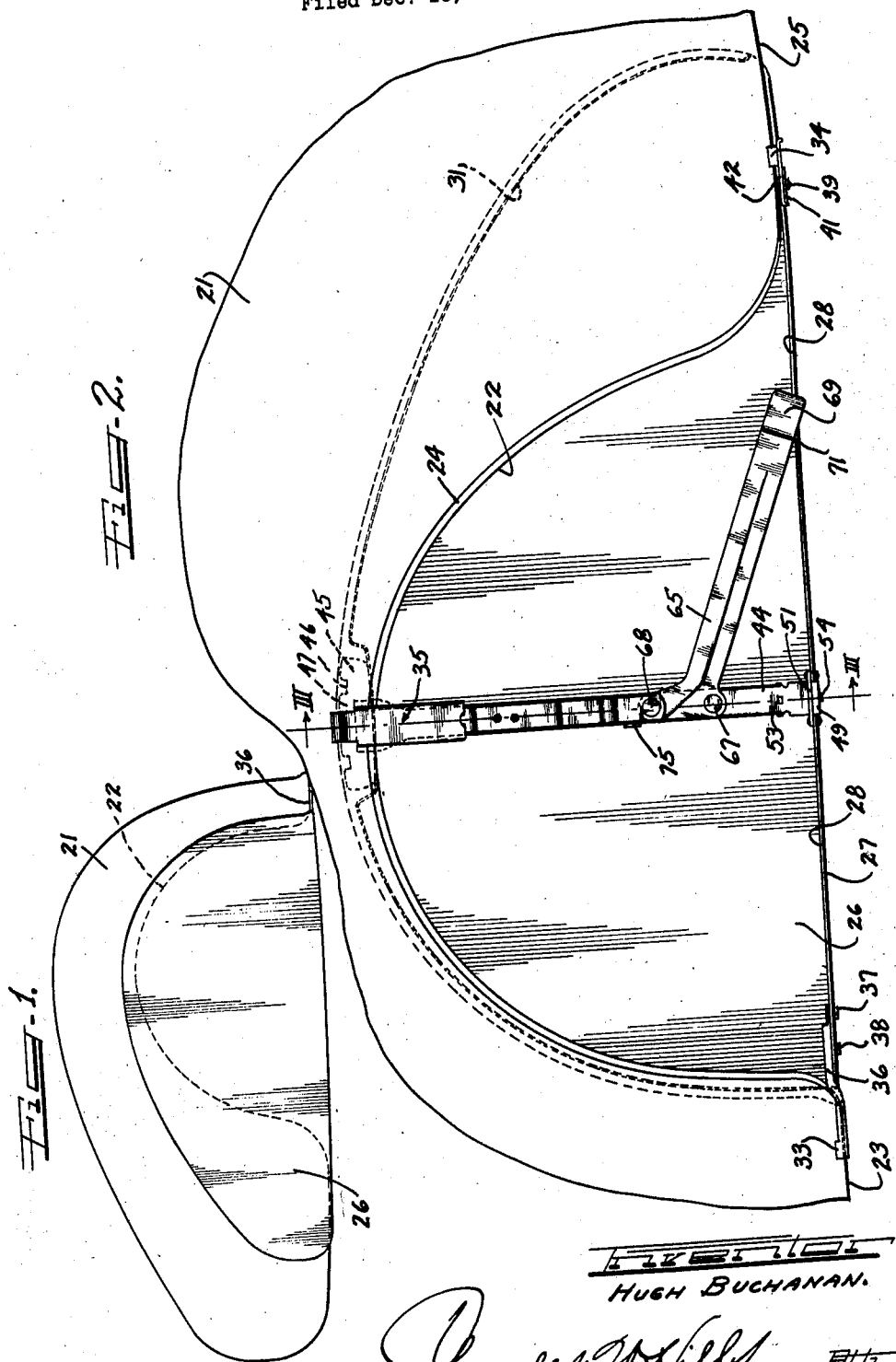

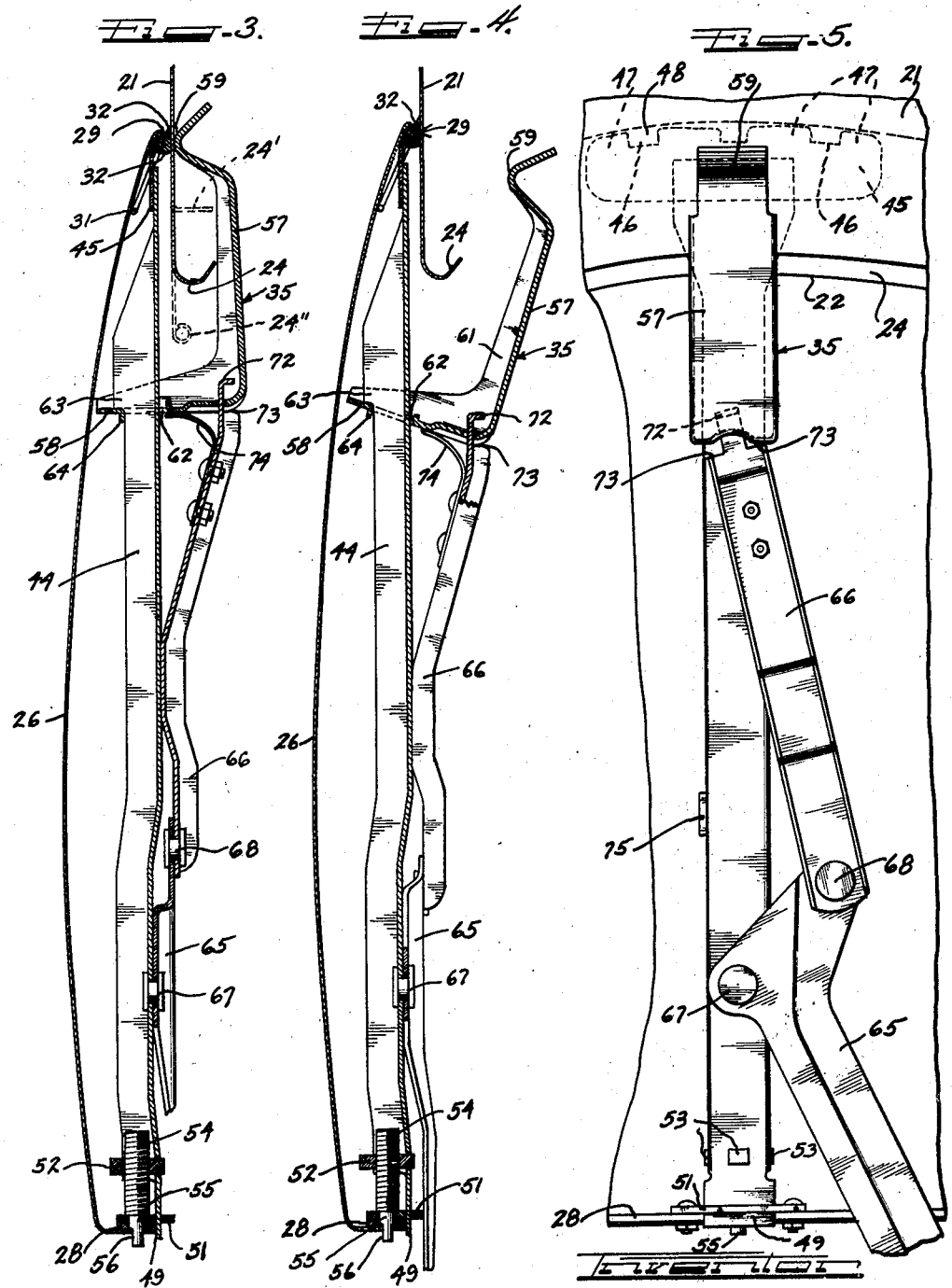

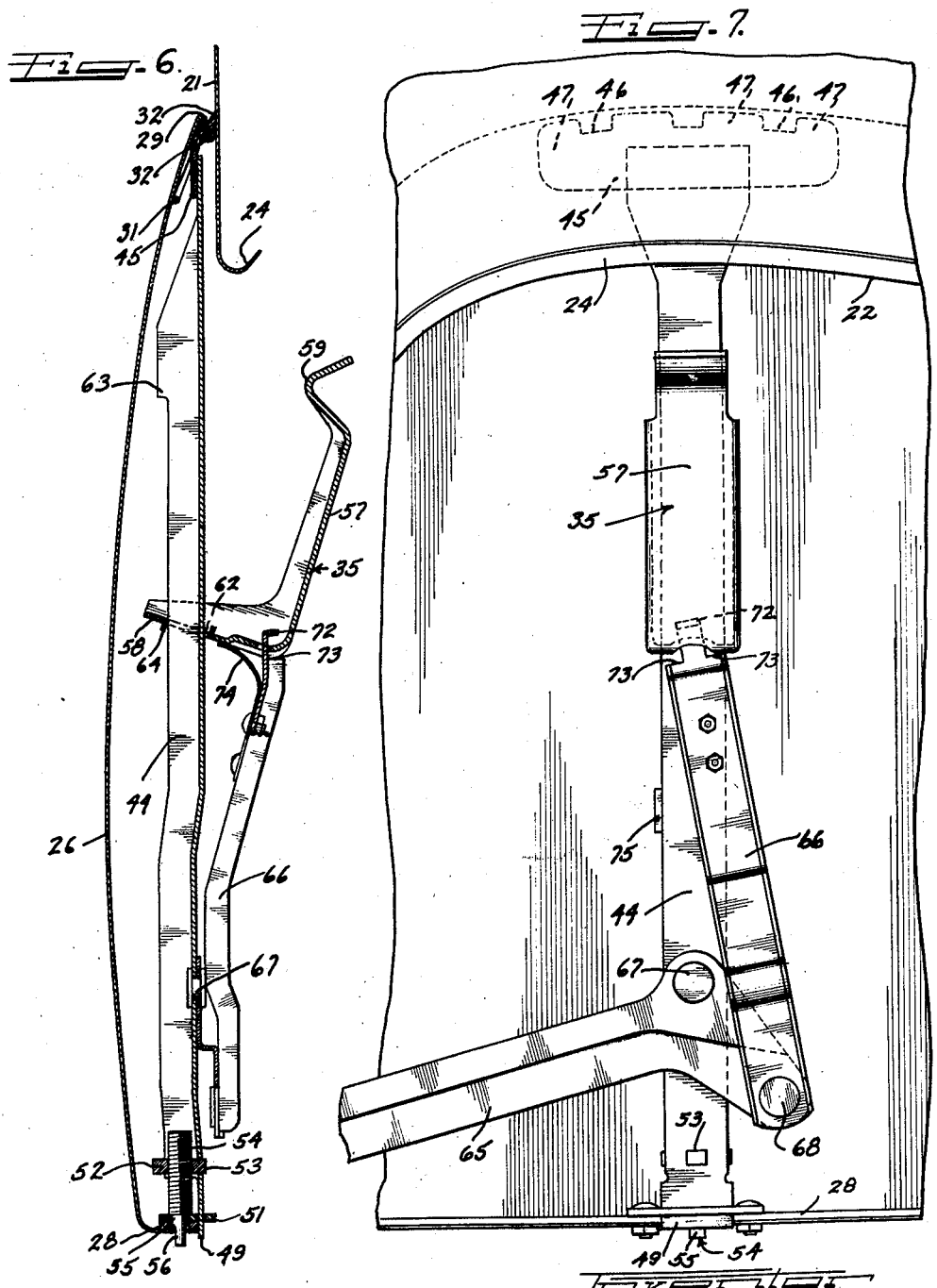

2,302,415

UNITED STATES PATENT OFFICE 2,302,415

FENDER SHIELD MOUNTING

Hugh Buchanan, Detroit, Mich., assignor to Houdaille-Hershey Corporation, Detroit, Mich., a corporation of Michigan Application December 16, 1939, Serial No. 309,538

10 Claims. (Cl. 292—64)

This invention relates to a fender shield and fender shield assembly, and more particularly, to fender shields having a novel means for securing the same to a vehicle fender and which cooperate with the fender in a novel manner.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in an axial direction. Fender shields have been employed to improve the appearance of the vehicle body by substantially covering the wheel access opening in the vehicle fender.

As the term "fender shield" shall hereinafter be employed, it refers to any member which is adapted to be secured to a fender or other portion of the vehicle body for the purpose of covering the opening in the fender of a vehicle body which is provided for access to or removal of a vehicle wheel. Furthermore, as the term "fender" shall hereinafter be employed, it refers to any form of wheel fender in its broad sense, whether said fender be separate from the vehicle body, partially separate from the vehicle body, or actually an integral part of the vehicle body and whether or not it projects outwardly away from the principal body portion of the vehicle.

In the manufacture of fender shields, at the present time, when they are largely used only as optional equipment, it is extremely desirable to be able to employ the same fender shield, or, at least, the same fender shield panel on different makes or lines of automobiles and thus effect a substantial saving in the cost of dies and other elements of the manufacturing cost.

The problem of making one fender shield panel fit on a number of different fenders has been partially solved by designing the fender shield panel to fit against the approximately vertical side of the fender instead of within the wheel access opening so that the fit of the fender shield panel is independent of the exact shape of the wheel access opening. Another part of the above problem has been solved by providing adjustable or replaceable hooks at the bottom of the fender shield for engaging the inturned edge of the fender ahead of and behind the wheel access opening, the adjustability or replaceability of these hooks or supports allowing the fender shield to be used on different fenders, as is fully explained in the George W. Schatzman copending application entitled "Fender shield and mounting means therefor," Serial No. 271,915, now U. S. Letters Patent No. 2,241,043 dated May 6, 1941, and assigned to the same assignee as the present invention.

Fender shields of the character above referred to, are designed to have a substantial degree of overlap with the downwardly depending substantially vertical side wall of the vehicle fender. These fender shields are further designed so that only the peripheral edge of the fender shield engages and is seated on the vehicle fender.

In the fender shields which have been constructed in the past the latching means at the top of the fender shield has been designed and arranged to engage the inturned flange which extends around the wheel access opening in the vehicle fender. It has been found that a latch of this character applies a force to the inner side of the vehicle fender which is not directly opposite the opposed point on which the peripheral edge of the fender shield is seated on the vehicle fender. The effect of this is to introduce a bending moment in the fender shield in the region of the latch which is undesirable.

It is an object of the present invention to provide a novel fender shield latching mechanism in which the above referred to undesirable characteristic has been eliminated.

Another object of the present invention is to provide a novel fender shield and fender shield assembly wherein the fender shield is latched to the fender in a novel manner.

A further object of the present invention is to provide a novel latch structure for securing a fender shield to a vehicle fender which latch construction introduces no undesirable bending moment in the fender shield even though the fender shield be seated on the vehicle fender only along a line spaced from the opening defining edge of the vehicle fender.

Another and further object of the present invention is to provide a novel latch construction in which the latch arm engages the vehicle fender only at a point spaced from the inturned flange which defines the opening in the fender.

Another and still further object of the present invention is to provide a novel latching arm which is arranged for both translational movement and rocking movement as it is moved into and out of engagement with a vehicle fender.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1 is a front elevational view of a vehicle fender and fender shield assembly;

Figure 2 is a rear elevational view of the fender and fender shield assembly shown in Figure 1;

Figure 3 is a cross-sectional view through the fender and fender shield assembly as taken along the line III—III of Figure 2 and illustrates the latching mechanism in latched engagement;

Figure 4 is a sectional view through the fender and fender shield assembly showing the latching arm partially retracted;

Figure 5 is a rear view of the latching mechanism in the position as shown in Figure 4;

Figure 6 is a sectional view through the fender and fender shield assembly showing the latch member in a fully retracted position; and Figure 7 is a rear view of the latching mechanism in the fully retracted position as shown in Figure 6.

The preferred embodiment of the invention illustrated in the drawings is designed to be mounted upon a conventional "streamlined" automobile fender 21 having an approximately semi-circular wheel access opening 22. The edge of the fender 21 along the bottom and around the wheel access opening 22 is bent in so as to form an inwardly projecting flange 23, 24, 25 in front of, around and in back of the wheel access opening 22.

The fender shield comprises a sheet panel 26 which is large enough to cover the entire wheel access opening 22 as shown in Figures 1 and 2. The lower edge of the panel 26 is approximately straight and is bent back to form a horizontal flange 27, to the upper side of which is secured a reinforcing bar 28. At the ends and around the top, the edge of the panel 26, which lies against the side of the fender 21, is folded back, as shown in Figure 3, to form a thin U-shaped reinforcement 29. The reinforcement 29 not only serves to strengthen the edge of the panel 26 but also serves, in connection with a stiff wire 31, to secure a rubber edging 32 which prevents metal to metal contact between the edge of the metal panel and the side of the fender. The manner in which the rubber edging 32 is held in place forms no part of the present invention and is fully described and illustrated in the copending application entitled "Fender shield," Serial No. 269,651, filed April 24, 1939 by George W. Schatzman, now U. S. Letters Patent No. 2,250,136 dated July 22, 1941 and assigned to the same assignee as the present application.

The curvature of the fender shield panel 26 may be adjusted in order to make it fit different fenders by means of a stay or strut mechanism extending between the top and bottom edges on the back of the panel. This mechanism comprises a stay or strut 44 which is channel-shaped in cross section throughout the greater part of its length and which has its upper end flattened and spot welded to a shoe or plate 45 which fits up in under the flange 29 on the edge of the fender shield panel 26 and holds the upper end of the stay 44 in place.

The shoe or plate 45 on the upper end of the stay or strut serves also to support a portion of the rubber edging 32 which is not held in place by the edging support wire 31. For this purpose, the upper edge of the plate 45 is provided with a plurality of rectangular notches 46 which divide the upper edge of the plate into a plurality of upwardly projecting fingers 47. One side of the rubber edging 32 is cut away to provide room for the fingers 47, lugs 48 being left between the cut away places and fitting into the notches 46. The lugs 48 are thus engaged from underneath by the shoe or plate 45 and hold the rubber edging 32 up in place.

The lower end of the stay 44 is formed into a flat tongue 49 which extends down behind the reinforcing bar 28, passing through an opening in a guide plate 51 riveted on top of and projecting behind the reinforcing bar 28. A nut 52 is secured on the inner side of the stay 44 a short distance above the guide plate 51 by means of three integral ears or lugs 53 which project through holes in the back and in the flanges of the stay 44. The nut 52 receives an adjusting screw 54 which extends down and has a shoulder which bears against the top of the guide plate 51. The lower end of the adjusting screw 54 is formed into a stem 55 which extends down through a hole in the guide plate 51 and the reinforcing or bottom bar 28 and the panel flange 27 and which is provided with a pair of flats 56 adapted to receive a wrench for turning the screw 54. Suitable means may be provided for preventing accidental rotation of the adjusting screw 54, one such means being shown, for example, in Figure 13 of the copending application entitled "Adjustable fender shield" Serial No. 293,013, filed September 1, 1939, by George W. Schatzman now U. S. Letters Patent No. 2,273,539, dated Feb. 17, 1942, and assigned to the same assignee as the present application.

The provisions of the adjusting screw 54 makes it possible to adjust the effective length of the stay 44 and to thus vary the curvature of the fender shield panel so that it will fit against the sides of different fenders. Thus the fender shield can be made to have a tight, even contact between its entire edge and the side of the particular fender upon which it is to be mounted.

The latch 35 is characterized by the fact that, when it is in its operative position shown in Figure 3, it presses against the inside of the fender 21 at a point above the inturned edge or flange 24 on the fender and directly opposite the infolded edge 29 at the top of the fender shield panel 26. The latch 35 is further characterized by the fact that it bears lightly, if at all, upon the fender flange 24 and by the fact that, when it is in its retracted position shown in Figure 6, its uppermost portion is lowered to a point well below the top of the fender shield panel 26 and the edge 24 on the fender at the top of the wheel access opening. The purpose of this arrangement is to enable the same latch 35 to fit equally well on fenders having different types of flanges and different sizes of wheel access openings. For example, the latch 35 will fit equally well on a fender having a large wheel access opening and a narrow flange 24' of medium width, or upon a fender having a small wheel access opening and an edge 24" formed into a bead around a wire, as shown in dotted lines in Figure 3.

The latch 35 may be constructed and operated in numerous ways in order to have these characteristics, but only the preferred form need be illustrated and described. In this form, the latch 35 is a generally L-shaped member having an upright leg portion 57 a base portion 58 extending at approximately right angles to the upright portion 57, and a nose portion 59 at the top of the upright portion and projecting in over the base portion. Both the upright leg portion 57 and the base or foot portion 58 of the latch are provided with a continuous deep flange 61 on each side in order to prevent any appreciable bending or flexing of the two portions relative to each other. The base 58 of the latch is formed with an aperture 62 through which the upright stay 44 extends. The stay 44 is a loose fit in the aperture 62 so that the latch 35 can slide up and down and swing in and out between the various positions shown in Figures 3, 4, and 6. Upward movement of the latch 35 is limited by a pair of shoulders 63 formed on the flanges of the stay 44 and adapted to bear against the upper surface of the base 58 of the latch as shown in Figures 3 and 4. At the point where the shoulders 63 bear upon it, the latch is reinforced by a transverse flange 64 depending from the edge of the aperture 62.

The latch 35 is moved up and down and swung in and out between the various positions shown by means of a toggle mechanism formed by a lever 65 and a link 66. The lever 65 is carried by a pivot 67 near the lower end of the stay 44 and is connected to the lower end of the link 66 by another pivot 68. The lever 65 is dog-legged in shape so that when the two pivots 67 and 68 are in the same vertical plane, as shown in Figure 2, the handle end 69 of the lever will lie just behind the lower edge of the fender shield panel. When the lever is in this position, an offset 71 rests upon the top of the reinforcing bar 28, and this prevents the lever from swinging down accidentally, but it may be swung down when desired by being sprung out far enough to enable the offset 71 to clear the reinforcing bar 28.

The link 66 is provided at its upper end with a hooked finger 72 which projects up through an aperture in the base 58 of the latch 35 near the corner between the base and the upright portion. The top of the link 66 at each side of the finger 72 forms a pair of shoulders 73 which are adapted to engage the under side of the base 58 of the latch for pushing it upwardly while the hooked finger 72 serves both to keep the upper end of the link 62 in position under the latch 35 and to move the latch downwardly.

A leaf spring 74 is fixed to the link 66 near its upper end and bears against the under side of the base 58 of the latch at a point near the stay 44 in order to resiliently hold the latch with its upright portion 57 swung away from the stay 44, as shown in Figures 4 and 6. The spring 74 is readily flexed when the base 58 of the latch comes up against the shoulders 63 on the stay 44, as shown in Figure 4, and the latch 35 is swung to the position shown in Figure 3.

A stop 75 is spot welded or otherwise secured to the side of the stay 44 away from the handle end 69 of the latch operating lever and is adapted to prevent movement of the toggle mechanism 65, 66 beyond its straightened-out position shown in Figure 2. When the mechanism is in this position, it is prevented from moving in one direction by the stop 75 and in the other direction by the offset 71 near the handle end of the lever 65 which engages the top of the reinforcing bar 28.

The method of mounting the fender shield upon the fender and the mode of operation of the latch mechanism is as follows: The latch operating lever 65 is first swung around to the position shown in Figures 6 and 7 in which the latch 35 is in its lowermost position. The fender shield is then held opposite its mounted position upon the fender with its upper portion spaced out a considerable distance from the fender so that the fender shield lies at a considerable angle to the vertical. While the fender shield is held at this angle, its lower edge is inserted under the fender and the hooks 33 and 34 are hooked onto the flanges 23 and 25 at the bottom of the fender in front of and behind the wheel access opening. This makes a support for the fender shield and holds its lower portion in against the side of the fender. The top of the fender shield is then swung in against the fender to the position shown in Figure 6. The manipulation of the fender shield thus far, is similar to that of the fender shield shown in my copending application Serial No. 233,935 entitled "Fender shield" and filed on October 8, 1938 now U. S. Letters Patent No. 2,226,894 dated Dec. 31, 1940, the fender shield shown in this application being an improvement but operating on the same general principles as the fender shield shown in my prior application.

The latch mechanism is then operated by swinging the handle 65 from the position shown in Figure 7 around through the position shown in Figure 5 to the position shown in Figure 2. When this is done, the upper end of the link 66 pushes the latch 35 up from the position shown in Figure 6 to the position shown in Figure 4 wherein the nose 59 of the latch has risen up behind the side of the fender 21 and the base portion 58 of the latch has come up against the shoulders 63.

As the upward movement of the link 66 continues, the latch 35 is swung from the position shown in Figure 4 to the position shown in Figure 3, swinging about the shoulders 63 on the stay as a fulcrum, and the nose 59 of the latch is pressed tightly against the back of the side of the fender 21. This clamps the top of the fender shield tightly against the side of the fender and is the final step in securely fastening the fender shield in place. When this step is completed, the fender shield is held against moving vertically in either direction by the hooks 33 and 34 at the bottom, the bottom of the fender shield is held in tightly against the side of the fender by the hooks 33 and 34 and the top of the fender shield is held in tightly against the side of the fender by the latch 35. The friction between the fender shield and the fender is more than enough to prevent any sliding in a fore and aft direction. Thus no accidental movement of the fender shield in any direction can occur.

From the foregoing, it will be seen that I have provided a fender shield having a latch which engages the approximately vertical inner surface of the fender at a point above the edge of the wheel access opening and whose operation is therefore independent of the exact character or position of the edge of the wheel access opening. This permits the fender shield to be used equally well on a wide variety of fenders and enables the same design of fender shield to be supplied for use on substantially all of the various makes of automobiles now being manufactured.

While I have shown a particular embodiment of my invention it will, of course, be understood that I do not wish to be limited thereto, since many modifications may be made, and I, therefore, contemplate by the appended claims to cover all such modifications as fall within the true spirit and scope of my invention.

I claim as my invention:

1. A latch for a fender shield having a panel adapted to cover the wheel access opening in the depending side wall of a fender and having means to hold the bottom of said panel against the side of said fender and to support said fender shield, said latch located near the upper margin of said panel and having a portion for engaging the inner side of said fender side wall, and means for moving said latch portion upwardly with respect to said panel while spaced inwardly from said panel and for thereafter moving said latch portion outwardly towards said panel.

2. A latch for a fender shield having a panel adapted to cover the wheel access opening in the depending side wall of a fender and having means to hold the bottom of said panel against the side of said fender and to support said fender shield, said latch including a vertically extending guide rigidly secured on the back of said panel, and a latch member slidably mounted on said guide and swingable towards and away from said panel.

3. A latch for a fender shield having a panel adapted to cover the wheel access opening in the depending side wall of a fender and having means to hold the bottom of said panel against the side of said fender and to support said fender shield, said latch including a vertically extending guide rigidly secured on the back of said panel, an upwardly extending latch member having the lower portion thereof slidably mounted on said guide, and means for imparting both translational movement and rotational movement to said latch member to move said latch member vertically along said guide and to swing it towards and away from said panel.

4. A latch for a fender shield having a panel adapted to cover the wheel access opening in the depending side wall of a fender and having means to hold the bottom of said panel against the side of said fender and to support said fender shield, said latch including an upright stay on the back of said panel, an angular latch member in back of said panel, said latch member having a lower portion extending towards said panel and slidably engaging said stay and having an upright portion adapted to extend behind said depending side wall of said fender, means on said stay for limiting the upward movement of said latch member, and means acting on said latch member at a point spaced rearwardly from said stay for urging said latch member upwardly.

5. A latch for a fender shield having a panel adapted to cover the wheel access opening in the depending side wall of a fender and having means to hold the bottom of said panel against the side of said fender and to support said fender shield, said latch including a vertical stay on the back of said panel and having a downwardly facing abutment near the upper margin of said panel, a latch member having a lower portion slidably embracing said stay below said abutment and swingable in a vertical plane with respect thereto, said latch member also having an upwardly extending portion spaced rearwardly from said stay and terminating in a nose portion adapted to engage the inner side of said fender side wall, and means for upwardly urging said latch member at a point spaced rearwardly from said abutment, said means also serving to swing said upper portion towards said panel for clamping engagement with said fender side wall.

6. A latch for a fender shield having a panel adapted to cover the wheel access opening in the depending side wall of a fender and having means to hold the bottom of said panel against the side of said fender and to support said fender shield, said latch including an upright stay on the back of said panel, an angular latch member in back of said panel, said latch member having a lower portion extending towards said panel and slidably engaging said stay and having an upright portion adapted to extend behind said depending side wall of said fender, means on said stay for limiting the upward movement of said latch member, and a toggle mechanism connected to said latch member at a point spaced rearwardly from said stay and connected to the lower portion of said stay for urging said latch member upwardly against said movement limiting means and for thereafter swinging the upper end of said upright portion of said latch member against the back of said depending side wall of said fender.

7. A latch for a fender shield having a panel adapted to cover the wheel access opening in the depending side wall of a fender and having means to hold the bottom of said panel against the side of said fender and to support said fender shield, said latch including a vertical stay on the back of said panel and having a downwardly facing abutment near the upper margin of said panel, a latch member having a lower portion slidably embracing said stay below said abutment and swingable in a vertical plane with respect thereto, said latch member also having an upwardly extending portion spaced rearwardly from said stay and terminating in a nose portion adapted to engage the inner side of said fender side wall, and a toggle mechanism connected to said latch member at a point spaced rearwardly from said abutment and connected to said vertical stay at a point spaced well below said abutment, said toggle mechanism serving to urge said latch member up against said abutment and to swing said nose portion of said latch member tightly against the inner side of said fender side wall.

8. A latch for a fender shield having a panel adapted to cover the wheel access opening in the depending side wall of a fender, said latch being located near the upper margin of said panel and having a portion for engaging the inner side of said fender side wall, said latch portion being movable vertically upwardly behind and with respect to said panel and being thereafterwards movable towards said panel, thereby to latch said shield to said fender.

9. A latch for a fender shield having a panel adapted to cover the wheel access opening in the depending side wall of a fender, said latch being located near the upper margin of said panel and having a portion for engaging the inner side of said fender side wall, and means for moving said latch portion upwardly relative to said panel while spaced inwardly from said panel and for thereafter moving said latch portion outwardly towards said panel.

10. A latch for a fender shield having a panel adapted to cover the wheel access opening in the depending side wall of a fender, said latch being located on the upper portion thereof and adapted to be operated by an upwardly directed force applied to a point thereon, a latch operating mechanism comprising an angular lever mounted on a pivot on the lower portion of said fender shield and having a handle end adapted to swing below said panel and to swing upwardly to a position behind said panel, releasable means for preventing downward swinging of said handle end from said position behind said panel, a link connecting said lever to said point on said latch, said link extending substantially in line with said point on said latch and with said lever pivot when said handle end is in said position behind said panel, and a stop for preventing movement of said handle upwardly beyond said position.

HUGH BUCHANAN.